ized Patent [19]

United States Patent [19]

Mauric et al.

[11] 4,193,805
[45] Mar. 18, 1980

[54] FLAME RETARDANT REGENERATED CELLULOSE CONTAINING A PHOSPHORIC ACID OR THIOPHOSPHORIC ACID AMIDE

[75] Inventors: Claudine Mauric, Basel; Rainer Wolf, Allschwil, both of Switzerland

[73] Assignee: Sandoz Ltd., Basel, Switzerland

[21] Appl. No.: 923,961

[22] Filed: Jul. 12, 1978

Related U.S. Application Data

[63] Continuation of Ser. No. 749,379, Dec. 10, 1976, abandoned, which is a continuation of Ser. No. 549,933, Feb. 14, 1975, abandoned.

[51] Int. Cl.² .......................... C09K 3/28; C08L 1/24
[52] U.S. Cl. ............................ 106/18.15; 8/116 P; 106/18.17; 106/18.18; 106/18.22; 106/165; 106/168; 106/177; 252/8.1; 264/192; 264/194

[58] Field of Search .................. 106/15 FP, 165, 168, 106/177, 18.15, 18.17, 18.18, 18.22; 260/551 P, 937, 959; 264/194; 252/8.1; 8/116 P

[56] References Cited

U.S. PATENT DOCUMENTS

| 3,449,161 | 6/1969 | Hindersinn et al. | 260/29.3 |
| 3,531,550 | 9/1970 | Herber et al. | 260/959 |
| 3,645,971 | 2/1972 | Hindersinn | 260/830 |
| 4,062,687 | 12/1977 | Mauric et al. | 260/45.9 R |

FOREIGN PATENT DOCUMENTS

1222885 2/1971 United Kingdom .

*Primary Examiner*—Lorenzo B. Hayes
*Attorney, Agent, or Firm*—Gerald D. Sharkin; Richard E. Vila; Joseph J. Borovian

[57] ABSTRACT

The present invention concerns novel flameproofed regenerated cellulose incorporating, as flameproofing agent, a phosphoric acid or thiophosphoric acid mono- or triamide.

17 Claims, No Drawings

FLAME RETARDANT REGENERATED CELLULOSE CONTAINING A PHOSPHORIC ACID OR THIOPHOSPHORIC ACID AMIDE

This is a continuation of application Ser. No. 749,379, filed Dec. 10, 1976, now abandoned, which in turn is a continuation of application Ser. No. 549,933, filed Feb. 14, 1975, now abandoned.

The present invention relates to flameproofed cellulose and more specifically to regenerated cellulose incorporating, as flameproofing agent, a phosphoric acid or thiophosphoric acid amide, and to a method of producing such cellulose.

Accordingly, the present invention provides flameproofed regenerated cellulose containing, as flameproofing agent, an effective amount of a compound of formula I

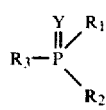
I wherein
Y is oxygen or sulphur,
either, $R_1$ and $R_2$ are each, independently,

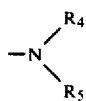

wherein,
either, $R_4$ is hydrogen or $(C_1-C_4)$alkyl
and $R_5$ is $(C_1-C_{12})$alkyl, cyclohexyl, benzyl, phenyl or phenyl substituted by 1 bromine atom, 1 to 3 chlorine atoms, 1 to 3 $(C_1-C_4)$ alkoxy groups, having 1 to 3 substituents and up to 4 carbon atoms in the aggregate of the substituents,
or $R_4$ together with $R_5$ and the nitrogen atom to which they are bound form a 5 or 6 membered saturated heterocycle containing 1 or 2 heteroatoms,
or $R_1$ and $R_2$, together form a group

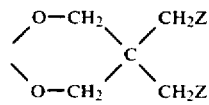

wherein
each Z is, independently, hydrogen or $(C_1-C_3)$alkyl,
and $R_3$ is a group

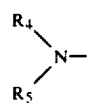

wherein $R_4$ and $R_5$ are as defined above, or a group

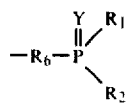

wherein
$R_1$, $R_2$ and Y are as defined above
and $R_6$ is either a group

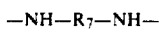

wherein $R_7$ is $(C_2-C_{10})$alkylene or phenylene, or a group

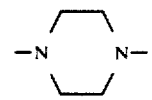

with the provisos that
(a) when $R_1$ and $R_2$ together form the group

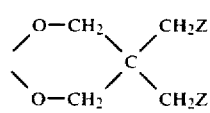

then Y is sulphur,
(b) when any $R_5$ is $(C_1-C_{12})$alkyl then Y is sulphur, and
(c) when any $R_4$ is $(C_3$ or $C_4)$alkyl then $R_5$ of the same amine group is alkyl.

Where any significance, e.g.

occurs more than once, these may be the same or different.

The flameproofed regenerated cellulose of the invention preferably contains as flameproofing agent a compound of formula I a

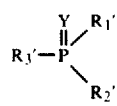
I a wherein
Y is as defined above,
either, $R_1'$ and $R_2'$ are each, independently,

wherein,
either, $R_4'$ is hydrogen or $(C_1-C_3)$ alkyl
and $R_5'$ is $(C_1-C_6)$alkyl, cyclohexyl, phenyl or phenyl substituted by 1 bromine atom in the para-position, 1 or 2 chlorine atoms, wherein not more than 1 chlorine occupies an ortho-position, and/or a $(C_1$ or $C_2)$alkyl, having up to 2 substituents in the aggregate,
or $R_1'$ and $R_2'$ together form a group

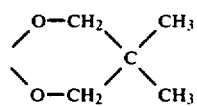

and $R_3'$ is a group

wherein $R_4'$ and $R_5'$ are as defined above, or a group

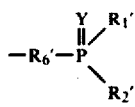

wherein
$R_1'$, $R_2'$ and Y are as defined above
and $R_6'$ is either a group $$-NH-R_7'-NH-$$

wherein $R_7'$ is $(C_2-C_6)$ straight chain alkylene or 1,4-phenylene, or a group

with the provisos that
(a') when $R_1'$ and $R_2'$ together form the group

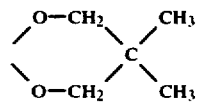

then Y is sulphur,
(b') when any $R_5'$ is $(C_1-C_6)$alkyl or cyclohexyl then Y is sulphur, and
(c') when any $R_4'$ is $(C_2$ or $C_3)$alkyl then $R_5'$ of the same amine group is alkyl.

Of the flameproofing agents of formula I ao

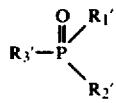  I ao wherein $R_1'$, $R_2'$ and $R_3'$ are as defined above, preferred are the compounds of formula I bo

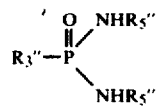  I bo wherein $R_5''$ is phenyl or phenyl substituted by 1 or 2 chlorine atoms, not more than 1 chlorine being in the ortho-position,
and $R_3''$ is a group $R_5''-NH-$ wherein $R_5''$ is as defined above, or a group

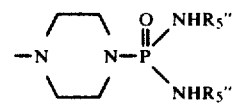

wherein $R_5''$ is as defined above, especially when $R_3''$ is a group $R_5''-NH-$, and more particularly the compounds of formula I co

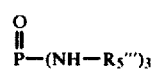  I co wherein each $R_5'''$ is independently ortho-, meta- or para-chlorophenyl especially when all $R_5'''$'s are the same.

Of the flameproofing agents of formula I as

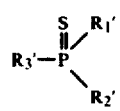  I as wherein $R_1'$, $R_2'$ and $R_3'$ are as defined above, preferred are the compounds of formula I bs

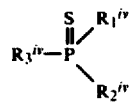  I bs wherein, either, $R_1^{iv}$ and $R_2^{iv}$ are each, independently,

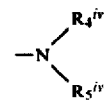

wherein
$R_4^{iv}$ is hydrogen or $(C_1$ or $C_2)$alkyl
and $R_5^{iv}$ is $(C_1$ or $C_2)$alkyl, phenyl or phenyl substituted by 1 or 2 chlorine atoms, wherein not more than 1 chlorine atom occupies an ortho-position, and/or 1 methyl, having not more than 2 substituents in the aggregate,
or $R_1^{iv}$ and $R_2^{iv}$ together form a group

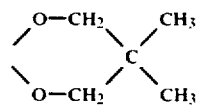

and $R_3^{iv}$ is a group

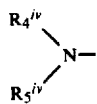

wherein $R_4^{iv}$ and $R_5^{iv}$ are as defined above, or a group

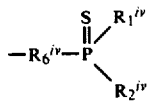

wherein $R_1^{iv}$ and $R_2^{iv}$ are as defined above, and $R_6^{iv}$ is

—NH(CH$_2$)$_2$NH— or

with the proviso that when any $R_4^{iv}$ is ethyl then $R_5^{iv}$ of the same amine group is alkyl, especially the compounds wherein $R_3^{iv}$ is a group

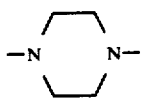

wherein $R_4^{iv}$ and $R_5^{iv}$ are as defined above, particularly when $R_4^{iv}$ is hydrogen, and especially the compounds of formula I cs $$\overset{S}{\underset{\|}{P}}-(NH-R_5'')_3 \qquad \text{I cs}$$

wherein $R_5^v$ is phenyl or phenyl substituted by 1 or 2 chlorine atoms, not more than 1 chlorine atom occupying an ortho-position, or a methyl group.

As will be apparent, in formula I, $R_1$, $R_2$ and $R_3$ preferably and *independently* respectively signify $R_1'$, $R_2'$ and $R_3'$ and in the same way $R_4$, $R_5$, $R_6$ and $R_7$ preferably and *independently* respectively signify $R_4'$, $R_5'$, $R_6'$ and $R_7'$.

For the compounds of formula I ao, $R_1'$, $R_2'$ and $R_3'$ preferably and *independently* respectively signify NHR$_5''$, NHR$_5''$ and $R_3''$ and more preferably each *independently* signifies —NH—R$_5'''$. In the same way, $R_4'$, $R_5'$ and $R_6'$ preferably and *independently* signify hydrogen, R$_5''$ and

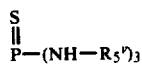

and more preferably R$_5''$ signifies R$_5'''$.

For the compounds of formula I as $R_1'$, $R_2'$ and $R_3'$ preferably and *independently* respectively signify $R_1^{iv}$, $R_2^{iv}$ and $R_3^{iv}$ and more preferably each *independently* signifies —NH—R$_5^v$. In the same way, $R_4'$, $R_5'$ and $R_6'$ preferably and *independently* respectively signify $R_4^{iv}$, $R_5^{iv}$ and $R_6^{iv}$ and more preferably $R_4'$ and $R_5'$ independently signify hydrogen and R$_5^{iv}$.

Examples of hetero atoms which may be additional to the nitrogen atom in the radical of formula

when the latter represents a saturated 5- or 6-membered heterocycle are oxygen, sulphur and nitrogen atoms. Preferably, the heterocycle comprises a piperidino, morpholino or piperazino ring.

Examples of alkyl radicals, unless otherwise stated, are natural or synthesizable, primary, secondary or tertiary, straight chain or branched radicals. Examples of such primary radicals are methyl, ethyl, propyl, butyl, pentyl, hexyl, heptyl, octyl, nonyl, undecyl, dodecyl, preferably methyl, ethyl, propyl, butyl.

Examples of alkylene radicals are 1,2-ethylene, 1,3-propylene, tetramethylene, hexamethylene, preferably 1,2-ethylene and hexamethylene.

Examples of substituted phenyl radicals are 2-, 3- or 4-methyl-phenyl, 2-, 3- or 4-chlorophenyl, 3- or 4-bromophenyl, 2,3-, 2,4-, 2,5-, 3,4- or 3,5-dichlorophenyl, 2,4,5-trichlorophenyl, 2,3-, 2,4-, 2,5-, 2,6-, 3,4-, 3,5-dimethylphenyl, 2,4,5-, 2,4,6-trimethylphenyl, 2-methyl-4-bromophenyl, 3-methyl-4-bromophenyl, 2-chloro-6-methyl-phenyl, 3-chloro-2-methyl-phenyl, 4-chloro-2-methyl-phenyl, 5-chloro-2-phenyl, 2-, 4-ethylphenyl, 2,4-diethylphenyl, 2-, 3-, 4-methoxyphenyl, 3-chloro-4-methoxy-phenyl, 3-chloro-6-methoxyphenyl, preferably phenyl, 2-methyl-phenyl, 4-chlorophenyl, 2-chlorophenyl, 3,4- and 2,5-dichlorophenyl. Examples of the radical —N(R$_4$)R$_5$ are the radicals indicated for R$_5$, where, when R$_5$ signifies phenyl or substituted phenyl; R$_4$ preferably signifies hydrogen.

Substitution of the phenyl ring by bromine is preferably effected in para-position.

The compounds of formula I are in general known or may be produced in manner known per se.

Thus the compounds of formula I wherein Y is oxygen may be produced in accordance with the method described in Houben-Weyl, Methoden der organischen Chemie, 4th edition, volume 12/II, pages 465–475. For example the compounds, wherein $R_1$ and $R_2$ signify

and Y signifies O, may, for example, be produced by reaction of phosphorus oxychloride with a primary or secondary amine in the presence of an acid-binding agent and optionally in the presence of an inert solvent. A corresponding excess of the amine which takes part in the reaction and/or a tertiary amine such as pyridine may be used as acid-binding agent. Inert solvents are, for example, benzene, toluene, chloro- and dichlorobenzene, tetrahydrofuran, diethyl ether. Analogous examples for the production of specific compounds are further described in the literature, e.g. in Berichte der deutschen chemischen Gesellschaft, volume 28, pages 619–620 (1895) and in Liebig's Annalen der Chemie, volume 326, pages 251-252 (1903). Thus, according to this scheme compounds Nos. 2, 3, 4, 6, 7, 8a and 8b of Table 1 below may, for example be produced. According to the method described in Industrial and Engineering Chemistry, Process Research and Development, volume 13, No. 1, pages 85-86 (1974), the compounds Nos. 1, 5 and 9 of Table 1 below may, be example, be produced.

In some cases it is convenient to react first phosphorus trichloride in the presence of an acid-binding agent and an inert solvent with preferably a secondary amine. A corresponding excess of the amine to be reacted is preferably used as acid-binding agent. The resulting phosphorus acid triamide is subsequently oxidized to the phosphoric acid triamide. Examples for this method of production are, for example, described in Zh. obshch.Khim., volume 43, No. 9, pages 1900-1903 (1973) or in Journal of the Chemical Society, London, page 4682 (1957). According to this method compound No. 8 of Table 1 is produced. In the case of asymmetric phosphoric acid triamides, the phosphoric acid monoamide-dichloride of formula

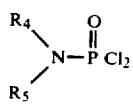

or the phosphoric acid-diamide-monochloride of formula

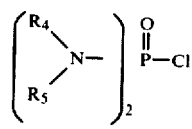

is first produced by reaction of an amine or amine hydrochloride with phosphorus oxychloride. Subsequently they are reacted with a second amine in the presence of an acid-binding agent to the asymmetric phosphoric acid triamide. Examples thereof are described in Liebig's Annalen der Chemie, volume 326, pages 129-256 (1903), in Berichte der deutschen chemischen Gesellschaft 27, pages 2572-2579 (1894) and ibid. 28, pages 613-620 (1895) and in Zh. obshch. Khim., volume 30, page 3584 (1960). According to this method compounds No. 10 to 17 of Tables 2 and 3 below may be produced.

TABLE 1

| No. | COMPOUND | M.P. °C. |
|---|---|---|
| 1 | 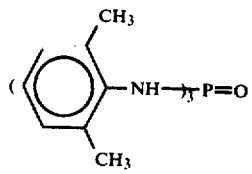 | 214-6 |
| 2 | 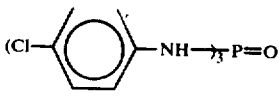 | 242-3 |
| 3 | 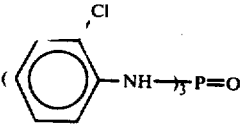 | 225-6 |
| 4 | 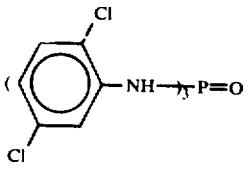 | 238-40 |
| 5 | 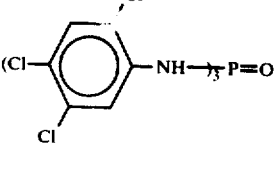 | 239-41 |
| 6 | 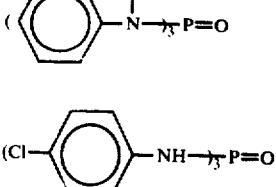 | 257-9 |
| 7 | 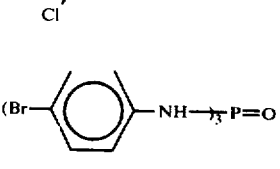 | 302-4 |
| 8 | 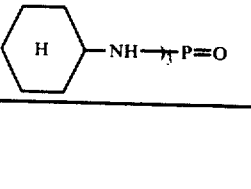 | 136-8 |
| 8a | 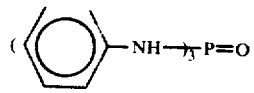 | 205-6 |
| 8b | (Br—⟨ ⟩—NH)₃P=O | 261-2 |
| 9 | 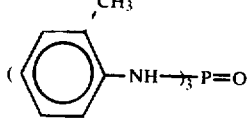 | 252-4 |

TABLE 2

UNSYMMETRICAL TRIAMIDES $$\left[ \begin{array}{c} R_4 \\ \diagdown \\ N \\ \diagup \\ R_5 \end{array} \right]_2 \!\!\! \begin{array}{c} O \\ \| \\ P \end{array} \!\!\! - \!\!\! N \!\!\! \begin{array}{c} \diagup R_4 \\ \diagdown R_5 \end{array}$$

| No. | COMPOUND | M.P. °C. |
|-----|----------|----------|
| 10  | (C₆H₅–NH–)₂P(=O)–N(CH₃)(C₆H₅) | 191–2 |
| 11  | (Cl–C₆H₄–NH–)₂P(=O)–NH–C₆H₅ | 212–3 |
| 12  | (Cl–C₆H₄–NH–)₂P(=O)–N(CH₃)(C₆H₅) | 219–20 |

$$\left[ \begin{array}{c} R_4 \\ \diagdown \\ N \\ \diagup \\ R_5 \end{array} \right]_2 \!\!\! \begin{array}{c} O \\ \| \\ P \end{array} \!\!\! - \!\!\! \begin{array}{c} R_6 \\ | \\ N \end{array} \!\!\! - R_5 - \!\!\! \begin{array}{c} R_6 \\ | \\ N \end{array} \!\!\! - \!\!\! \begin{array}{c} O \\ \| \\ P \end{array} \!\!\! \left[ \begin{array}{c} R_4 \\ \diagup \\ N \\ \diagdown \\ R_5 \end{array} \right]_2$$

| No. | COMPOUND | M.P. °C. |
|-----|----------|----------|
| 13  | (C₆H₅–NH–)₂P(=O)–NH–CH₂–CH₂–NH–P(=O)(–NH–C₆H₅)₂ | 238–9 |
| 14  | (C₆H₅–NH–)₂P(=O)–N(piperazine)N–P(=O)(–NH–C₆H₅)₂ | 294–5 |
| 15  | (Cl–C₆H₄–NH–)₂P(=O)–N(piperazine)N–P(=O)(–NH–C₆H₄)₂ | 301–2 |
| 16  | (Cl–C₆H₄–NH–)₂P(=O)–N(piperazine)N–P(=O)(–NH–C₆H₄–Cl)₂ | 294–6 |
| 17  | (C₆H₅–N(CH₃)–)₂P(=O)–N(piperazine)N–P(=O)(–N(CH₃)–C₆H₅)₂ | 175–6 |

The production of the compounds of formula (I), wherein Y signifies sulphur, is effected in accordance with the processes described, for example, in Houben-Weyl, Methoden der organischen Chemie, 4th edition, volume 12/II, pages 759–769 and 785–791.

Thus, for example, the compounds, wherein $R_1$ and $R_2$ together signify $$\begin{array}{c} -OCH_2 \\ \diagdown \\ \diagup \\ -OCH_2 \end{array} \!\!\! C \!\!\! \begin{array}{c} \diagup CH_2Z \\ \diagdown CH_2Z \end{array}$$

and Z is as defined above, may be produced by reacting a 2-chloro-2-thiono-5,5-dialkyl-1,3,2-dioxaphosphorinane of formula $$Cl-\!\!\! \begin{array}{c} \| \\ P \\ \| \\ S \end{array} \!\!\! \begin{array}{c} \diagup OCH_2 \\ \diagdown OCH_2 \end{array} \!\!\! C \!\!\! \begin{array}{c} \diagup CH_2Z \\ \diagdown CH_2Z \end{array}$$

in the presence of an acid-binding agent and, in many cases, preferably in the presence of an inert solvent, with a primary or secondary amine or diamine. A corresponding excess of the amine to be reacted or a tertiary amine such as pyridine or triethylamine may be used as acid-binding agent. Examples of inert solvents are benzene, toluene, tetrahydrofuran or diethyl ether. Examples for such a method of production are described in the literature, e.g. in Tetrahedron, volume 20, pages 2781–2795 (1964). According to this scheme, compounds 18, 19, 20, 25, 26, 27, 28, 29 and 30 of Table 4 below may, for example, be produced.

In some cases it is convenient to react first 2-chloro-5,5-dialkyl-1,3,2-dioxaphosphorinane, $$Cl-P\!\!\! \begin{array}{c} \diagup OCH_2 \\ \diagdown OCH_2 \end{array} \!\!\! C \!\!\! \begin{array}{c} \diagup CH_2Z \\ \diagdown CH_2Z \end{array}$$

in the presence of an acid-binding agent, and in many cases preferably in the presence of an inert solvent, with a primary or secondary amine, and to add subsequently sulphur to the resulting intermediate step. An example for this method of production is described in Tetrahedron, volume 23, page 1703 (1967). According to this scheme, compounds 22, 23, 24, 26 and 43 of Table 4 below may, for example, be produced.

The compounds, wherein $R_1$ and $R_2$ signify

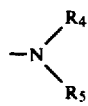

and Y signifies sulphur, may, for example, be produced by reacting thiophosphoryl chloride ($PSCl_3$) in the presence of an acid-binding agent and in many cases preferably in the presence of an inert solvent, with a primary or secondary amine. Examples for this method of production are described in the literature, e.g. in the Journal of Organic Chemistry, volume 24, page 1420 (1959) or in Liebig's Annalen der Chemie, volume 326, pages 201-219 (1903). Compounds 31, 32, 34, 35, 36, 37, 38, 41 and 44 of Table 4 below may, for example, be produced in accordance with this scheme.

In some cases, however, it is convenient to react first phosphorus chloride in the presence of an acid-binding agent and in an inert solvent with a preferably secondary amine, and to add subsequently sulphur to the resulting intermediate step. A corresponding excess of the amine to be reacted is preferably used as acid-binding agent. Examples for this method of production are, for example, described in the Chemical Reports, volume 28, pages 2205-2211 (1895) or in the Journal of the American Chemical Society, volume 78, pages 976-977 (1956). Compounds 39 and 40 may, for example, be produced in accordance with this scheme. In other cases, however, it is convenient to react corresponding amounts of phosphorus pentasulphide, $P_2S_5$, and amine. According to this method which is described in the Journal of the American Chemical Society, volume 70, pages 744-746 (1948), compound 33 of Table 4 may, for example, be produced.

In the case of mixed thiophosphoric acid triamides, thiophosphoric acid monoamide-dichloride or thiophosphoric acid diamide-chloride is produced by first reacting an amine or amine hydrochloride with thiophosphoryl chloride and subsequently reacting them with a second amine in the presence of an acid-binding agent to obtain mixed thiophosphoric acid triamide. Examples for this method are described in Liebig's Annalen der Chemie, volume 326, pages 201-258 (1903) and in volume 625, pages 92-94 (1959). Compound 42 of Table 4 may, for example, be produced in accordance with this scheme.

TABLE 4

| Compound | Structure | Melting Point (M.P.) or Boiling Point (B.P.) |
|---|---|---|
| 18 | (CH₃)₂C(CH₂O)₂P(=S)–NH–C₆H₅ | M.P. 163°–166° |
| 19 | (CH₃)₂C(CH₂O)₂P(=S)–NH–C₆H₄–Cl | M.P. 185°–188° |
| 20 | (CH₃)₂C(CH₂O)₂P(=S)–NH–C₆H₄–CH₃ | M.P. 156°–159° |
| 21 | (CH₃)₂C(CH₂O)₂P(=S)–NH–C₆H₃Cl₂ | M.P. 134°–138° |
| 22 | (CH₃)₂C(CH₂O)₂P(=S)–NH–C₆H₄–Cl | M.P. 94°–96° |
| 23 | (CH₃)₂C(CH₂O)₂P(=S)–N(CH₃)–C₆H₅ | M.P. 85°–88° |
| 24 | (CH₃)₂C(CH₂O)₂P(=S)–N(C₂H₅)₂ | M.P. 57°–60° |
| 25 | (CH₃)₂C(CH₂O)₂P(=S)–NH–C₃H₇ | M.P. 69°–70° |

TABLE 4-continued

| Compound | Structure | Melting Point (M.P.) or Boiling Point (B.P.) |
|---|---|---|
| 26 | (CH₃)₂C(CH₂O)₂P(=S)—NH—n-C₄H₉ | B.P. 121°–123°/ 0,08 mm Hg |
| 27 | (CH₃)₂C(CH₂O)₂P(=S)—NH—n-C₆H₁₃ | B.P. 125°–126°/ 0,05 mm Hg |
| 28 | (CH₃)₂C(CH₂O)₂P(=S)—NH—CH₂—C₆H₅ | B.P. 193°–195°/ 0,19 mm Hg |
| 29 | (CH₃)(CH₃CH₂CH₂)C(CH₂O)₂P(=S)—NH-n-C₃H₇ | B.P. 110°–112°/ 0,05 mm Hg |
| 30 | [(CH₃)₂C(CH₂O)₂P(=S)—N]₂(CH₂CH₂) piperazine | M.P. 303°–305° |
| 31 | S=P(NH—C₆H₅)₃ | M.P. 152°–154° |
| 32 | S=P(NH—C₆H₁₁)₃ | M.P. 140°–143° |
| 33 | S=P(NH—C₆H₄—Cl)₃ | M.P. 225°–226° |
| 34 | S=P(NH—C₆H₄—Cl)₃ (ortho) | M.P. 128°–130° |
| 35 | S=P(NH—C₆H₃Cl₂)₃ | M.P. 171°–174° |
| 36 | S=P(NH—C₆H₄—CH₃)₃ | M.P. 185°–187° |
| 37 | S=P(NH—C₆H₄—CH₃)₃ (ortho) | M.P. 131°–133° |
| 38 | S=P(NH—C₆H₄—Br)₃ | M.P. 216°–217° |
| 39 | S=P[N(C₂H₅)₂]₃ | B.P. 104°/0,04 mm Hg |
| 40 | S=P[N(C₃H₇)₂]₃ | B.P. 138°–140°/ 0,15 mm Hg |
| 41 | S=P(NH-n-C₆H₁₃)₃ | M.P. 51°–51.5° |

TABLE 4-continued

| Compound | Structure | Melting Point (M.P.) or Boiling Point (B.P.) |
|---|---|---|
| 42 | $(CH_3)_2N-\underset{\underset{S}{\|}}{P}(NH-\text{C}_6\text{H}_5)_2$ | M.P. 211°-212° |
| 43 | 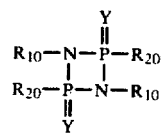 | M.P. 170°-172° |
| 44 | 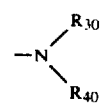 | M.P. 142°-144° |

According to a further aspect of the present invention, there is also provided a method of flameproofing regenerated cellulose which comprises regenerating the cellulose from a "cellulose" medium, e.g. viscose, containing a compound of formula I. The term "regenerated cellulose" and the manner of its production are well understood in the art. The common procedures for the regeneration of cellulose comprise the regeneration of the cellulose from an alkali cellulose xanthate or a cellulose tetramine cupric hydroxide complex solution, and such procedures are adapted, in particular the xanthate method, in accordance with the method of the invention by the addition of a compound of formula I to the "cellulose" medium. The compound of formula I may be added as such, dissolved in an appropriate solvent or in the form of a fine aqueous dispersion, preferably the latter. When added as such, the compound may be introduced into the "cellulose" medium either continuously or discontinuously, i.e. in batches, and thereafter vigorous stirring of the "cellulose" medium containing the compound of formula I may be applied to distribute the latter uniformly in the medium. The same technique may also be adopted for the addition of a solution or an aqueous dispersion of the compound. Preferably the solution or aqueous dispersion has a concentration by weight of the compound of 15 to 30%, or more preferably 20 to 25%. In all cases it can be advantageous to add conventional dispersion stabilisers and/or dispersion agents, e.g. sodium naphthalene sulphonate, to the "cellulose" medium to promote uniformity of distribution of the compound in the "cellulose" medium. The weight of compound of formula I present in the "cellulose" medium from which cellulose is to be regenerated is preferably in the range 5 to 35%, or more preferably 12 to 25% of the weight of the cellulose starting material, e.g. α-cellulose.

Other flameproofing compounds, e.g. reaction products of a phosphorus nitrile chloride with glycols or cyclodiphosphazanes or thionocyclodiphosphazanes, may be added to the cellulose solution as well as a compound of formula I. Such other suitable flameproofing compounds include the products of reactions between a phosphorus nitrile chloride and neopentyl glycol or other glycols, as described in German Offenlegungsschrift No. 2,316,959 and compounds of formula II $$\begin{array}{c} Y \\ \| \\ R_{10}-N-P-R_{20} \\ |\quad\quad| \\ R_{20}-P-N-R_{10} \\ \| \\ Y \end{array} \qquad \text{II}$$

in which
both Y's are oxygen or sulphur,
both $R_{10}$'s are cyclohexyl unsubstituted phenyl or phenyl substituted with up to 3 substituents selected from 1 to 3 chlorine atoms, a bromine atom in the paraposition, 1 to 3 $C_{1-4}$ alkyl radicals and 1 to 3 $C_{1-4}$ alkoxy radicals, the aggregate of the carbon atoms in the alkyl and/or alkoxy radicals being a maximum of 4, and, when Y is sulphur, both $R_{10}$'s may also be methyl,
and both $R_{20}$'s are a radical of formula $$-N\begin{matrix} R_{30} \\ \diagdown \\ R_{40} \end{matrix}$$

wherein
$R_{30}$ is hydrogen or $C_{1-4}$ alkyl,
and $R_{40}$ is $C_{1-12}$ alkyl, cyclohexyl, unsubstituted phenyl or phenyl substituted with up to 3 substituents selected from 1 to 3 chlorine atoms, a bromine atom in the paraposition, 1 to 3 $C_{1-4}$ alkyl radicals and 1 to 3 $C_{1-4}$ alkoxy radicals, the aggregate of the carbon atoms in the alkyl and/or alkoxy radicals being a maximum of 4,
or $R_{30}$ and $R_{40}$, together with the common nitrogen atom and optionally with a further hetero atom, form a saturated 5- or 6-membered heterocyclic ring, with the proviso that when simultaneously Y is oxygen, $R_{30}$ is hydrogen and $R_{10}$ is unsubstituted or substituted phenyl, $R_{40}$ is only unsubstituted or substituted phenyl, as described in Swiss Patent Application 15814/73.

The amount of additional flameproofing agent, when employed, may be up to 90% by weight of the total flameproofing agent present, preferably in the range 10 to 70%, and especially in the range 15 to 60%.

The regenerated cellulose may be processed and shaped in the normal way, e.g. by extrusion into filaments and sheets. Apart from flame-resistance, the so produced flameproofed regenerated cellulose possesses its normal technically important properties which are not significantly affected by the presence of the flameproofing agent.

The following Examples illustrate the present invention. In the Examples, the parts and percentages are by weight and the degrees are in Centigrade.

Production of flameproofed regenerated cellulose

EXAMPLE 1

18 Parts of a 20% aqueous dispersion of the flameproofing agent No. 5 of Table 1 are stirred into 200 parts of a cellulose solution based on cellulose xanthate and containing 18 parts of α-cellulose. A dispersion of this type is produced as follows:

15 Parts of the compound No. 5 together with 3.75 parts of a dispersing agent based on sodium naphthalene sulphonate and 56.25 parts of water are sandground in the presence of 75 parts of quartzite beads over the course of 4 hours. The process is effected with cooling with ice and at a stirring speed of 1500 r.p.m. After filtering off the quartzite beads, 67 parts of a dispersion containing 20% of active agent are obtained. The above-described cellulose solution containing the flameproofing agent is extruded according to the usual spinning method through spinnerets into a precipitating bath which contains the following substances per liter:

125 g of sulphuric acid, 240 g of sodium sulphate (anhydrous) and 12 g of zinc sulphate (anhydrous). The fibre obtained is washed adequately and processed into knitted goods. The knitted goods are tested with regard to their flame-resistance according to the Fenimore and Martin process (see Modern Plastics, November 1966), by determining the Limiting Oxygen Index.

Flameproofed regenerated cellulose samples, containing as flameproofing agent the compound Nos. 1, 2, 4, 6, 7, 8, 8a, 8b, 9, 14 or 16 of Tables 1 to 3 or a combination thereof are prepared in analogous manner.

EXAMPLE 2

The process is effected as in Example 1 employing as flameproofing agent compound Nos. 18, 19, 20, 21, 22, 30, 31, 32, 33, 34, 35, 36, 37, 38, 42, 43 and 44 of Table 4.

EXAMPLE 3

3.6 Parts of flameproofing agent No. 39 are stirred into 200 parts of a cellulose solution based on xanthate and containing 18 parts of α-cellulose. The mixture is processed into knitted goods in manner analogous to that described in Example 1.

Flame proofed regenerated cellulose containing as active agents the compound Nos. 26, 27, 28, 29 and 40 of Table 4 is prepared in analogous manner.

EXAMPLE 4

7.2 Parts of a 50% solution of flameproofing agent No. 24 of Table 4 in trichloroethylene are stirred into 200 parts of a cellulose solution based on xanthate and containing 18 parts of α-cellulose. The mixture is processed into knitted goods in manner analogous to that described in Example 1. Flameproofed regenerated cellulose samples containing as active agents compound Nos. 23, 25 and 41 of Table 4 are prepared in analogous manner using a 40–50% solution in dichloroethane.

EXAMPLE 5

9 Parts of a 20% aqueous dispersion of flameproofing agent No. 5 of Table 1 and 5.1 parts of a 35% aqueous dispersion of the reaction product consisting of oligomerous phosphoronitrile chlorides and 2,2-dimethyl-1,3-propandiol, are successively stirred into 200 parts of a cellulose solution based on xanthate and containing 18 parts of α-cellulose. The production of the dispersion of the flame-resistant active agent No. 5 is described in Example 1. The production of the dispersion of the mixture of reaction products, consisting of oligomerous phosphoronitrile trichlorides and 2,2-dimethyl-propandiol is effected in manner known per se as described, for example, in Example 4 of German published application 2,316,959.

Production and examination of the resulting flameproofed cellulose are effected in manner analogous to that described in Example 1.

EXAMPLE 6

9 Parts of a 20% aqueous dispersion of the flameproofing agent No. 5 of Table 1 and 9 parts of a 20% aqueous dispersion of 2,4-dianilino-1,3-cyclodiphosphazane are successively stirred into 200 parts of a cellulose solution based on xanthate and containing 18 parts of α-cellulose. The production of the dispersion of the flame-resistant active agent No. 5 is described in Example 1. The dispersion 2,4-dianilino-1,3-cyclodiphosphazane is produced in manner known per se. The production and examination of the corresponding flameproof cellulose is effected in manner analogous to that described in Example 1.

What we claim is:

1. Flameproofed regenerated cellulose containing, as flameproofing agent, a flameproofing effective amount of a compound of the formula

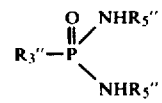

said flameproofed regenerated cellulose having been produced by regenerating cellulose from a cellulose-containing medium containing said flameproofing agent of the formula

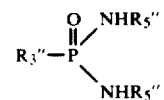

wherein
$R_5''$ is unsubstituted phenyl; or phenyl substituted by 1 or 2 chloro substituents, provided that not more than 1 chloro substituent is in an ortho-position; and
$R_3''$ is a group $$R_5''-NH-.$$

or a group

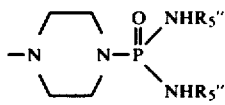

wherein R₅″ is as defined above.

2. Flameproofed regenerated cellulose according to claim 1 containing, as flameproofing agent, an effective amount of a compound of the formula

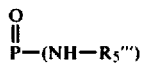

wherein each R₅‴ is, independently, ortho-, meta- or para-chlorophenyl.

3. Flameproofed regenerated cellulose according to claim 2 containing, as flameproofing agent, an effective amount of a compound of the formula

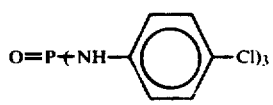

4. Flameproofed regenerated cellulose according to claim 2 containing, as flameproofing agent, an effective amount of a compound of the formula

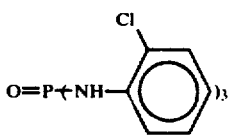

5. Flameproofed regenerated cellulose according to claim 1 containing, as flameproofing agent, an effective amount of a compound of the formula

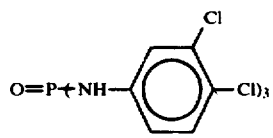

6. Flameproofed regenerated cellulose textile material composed wholly or partially of regenerated cellulose according to claim 1.

7. Flameproofed regenerated cellulose according to claim 1 wherein the cellulose is regenerated from an aqueous alkali cellulose xanthate solution containing the flameproofing agent.

8. Flameproofed regenerated cellulose containing, as flameproofing agent, a flameproofing effective amount of a compound of the formula

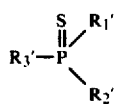

said flameproofed regenerated cellulose having been produced by regenerated cellulose from a cellulose-containing medium containing said flameproofing agent of the formula

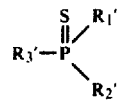

either, R₁' and R₂' are each, independently,

wherein
R₄' is hydrogen or C₁–C₃ alkyl; and
R₅' is C₁–C₆ alkyl; cyclohexyl; unsubstituted phenyl; or phenyl substituted by 1 or 2 substituents selected from bromo, chloro and C₁₋₂ alkyl, with the provisos that: (a) when substituted phenyl contains a bromo substituent, such substituent is in the para-position, (b) when substituted phenyl contains 2 chloro substituents, not more than 1 chloro substituent is in an ortho-position, (c) substituted phenyl contains not more than one C₁₋₂ alkyl substituent, and (d) substituted phenyl contains not more than one bromo substituent;
or R₁' and R₂' together form a group

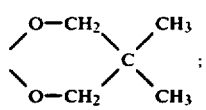

and R₃' is a group

wherein R₄' and R₅' are as defined above; or a group

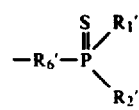

wherein
R₁' and R₂' are as defined above, and
R₆' is a group

—NH—R₇'—NH— wherein R₇' is C₂–C₆ straight chain alkylene or 1,4-phenylene;
or a group

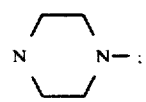

with the proviso that when any R₄' is C₂ or C₃ alkyl, then R₅' of the same amino group is C₁₋₆ alkyl.

9. Flameproofed regenerated cellulose according to claim 8 containing, as flameproofing agent, an effective amount of a compound of the formula

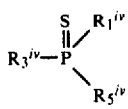

wherein either $R_1^{iv}$ and $R_2^{iv}$ are each, independently,

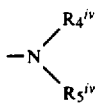

wherein
$R_4^{iv}$ is hydrogen; methyl; or ethyl; and
$R_5^{iv}$ is methyl; ethyl; unsubstituted phenyl; or phenyl substituted by 1 or 2 substituents selected from chloro and methyl, with the provisos that: (a) the maximum number of methyl substituents is 1, and (b) when substituted phenyl contains 2 chloro substituents, no more than 1 chloro substituent is in an ortho-position; or $R_1^{iv}$ and $R_2^{iv}$ together form a group

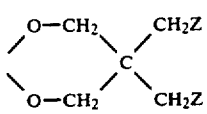

and $R_3^{iv}$ is a group

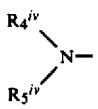

wherein $R_4^{iv}$ and $R_5^{iv}$ are as defined above; or a group

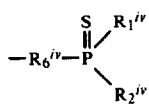

wherein $R_1^{iv}$ and $R_2^{iv}$ are as defined above, and $R_6^{iv}$ is

—NH(CH$_2$)$_2$NH—;

or

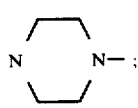

with the proviso that when any $R_4^{iv}$ is ethyl, then $R_5^{iv}$ of the same amino group is methyl or ethyl.

10. Flameproofed regenerated cellulose according to claim 9 containing, as flameproofing agent, an effective amount of a compound of the formula

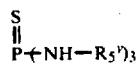

wherein $R_5^v$ is unsubstituted phenyl; phenyl substituted by 1 to 2 chloro substituents, provided that not more than 1 chloro substituent is in an ortho-position; or phenyl monosubstituted by methyl.

11. Flameproofed regenerated cellulose according to claim 10 containing, as flameproofing agent, an effective amount of a compound of the formula

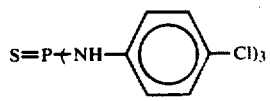

12. Flameproofed regenerated cellulose according to claim 10 containing, as flameproofing agent, an effective amount of a compound of the formula

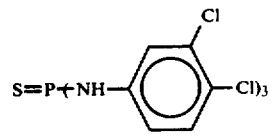

13. Flameproofed regenerated cellulose according to claim 10 containing, as flameproofing agent, an effective amount of a compound of the formula

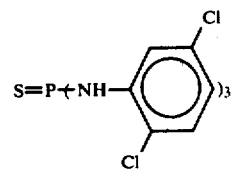

14. Flameproofed regenerated cellulose according to claim 10 containing, as flameproofing agent, an effective amount of a compound of the formula

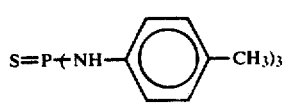

15. Flameproofed regenerated cellulose according to claim 10 containing, as flameproofing agent, an effective amount of a compound of the formula

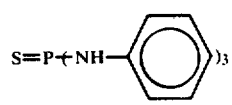

16. Flameproofed regenerated cellulose textile material composed wholly or partially of regenerated cellulose according to claim 8.

17. Flameproofed regenerated cellulose according to claim 8 wherein the cellulose is regenerated from an aqueous alkali cellulose xanthate solution containing the flameproofing agent.

* * * * *